(12) United States Patent
Bernhard et al.

(10) Patent No.: US 12,540,819 B2
(45) Date of Patent: Feb. 3, 2026

(54) SURVEYING POLE AND SECONDARY SENSOR UNIT HAVING TOROIDAL FORM

(71) Applicant: LEICA GEOSYSTEMS AG, Heerbrugg (CH)

(72) Inventors: Heinz Bernhard, Berneck (CH); Hannes Maar, Dornbirn (AT); Phillip Lukas Rüst, Herisau (CH); Klaus Frombach, Tettnang (DE); Markus Geser, Horn (CH); Ismail Roman Celebi, St. Gallen (CH); Matteo Carrera, Speicher (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 1090 days.

(21) Appl. No.: 17/548,364

(22) Filed: Dec. 10, 2021

(65) Prior Publication Data
US 2022/0187069 A1    Jun. 16, 2022

(30) Foreign Application Priority Data
Dec. 11, 2020   (EP) ..................................... 20213568

(51) Int. Cl.
    *G01C 3/08*    (2006.01)
    *G01C 15/00*    (2006.01)
(52) U.S. Cl.
    CPC .................. *G01C 15/002* (2013.01)
(58) Field of Classification Search
    CPC .................................................... G01C 15/002
    See application file for complete search history.

(56) References Cited

U.S. PATENT DOCUMENTS 5,457,890 A * 10/1995 Mooty ................. G01C 15/002
                                                             33/294
7,646,339 B2     1/2010 Green et al.
(Continued)

FOREIGN PATENT DOCUMENTS

CN        101040166 A    9/2007
CN        104897140 A    9/2015
(Continued)

OTHER PUBLICATIONS

CN Office Action dated Jan. 31, 2024 as received in Application No. 202111460356.X.
(Continued)

*Primary Examiner* — Mark Hellner
(74) *Attorney, Agent, or Firm* — Maschoff Brennan

(57) ABSTRACT

A surveying pole and to a secondary sensor unit which is attachable to the surveying pole. A reflector and/or GNSS receiver attachable to the surveying pole can be attached independently of whether or not the secondary sensor unit is attached to the surveying pole. A distance between the reflector and/or GNSS receiver and a pole tip is also independent of whether or not the secondary sensor unit is attached to the surveying pole. A distance between an attached reflector and/or GNSS receiver and the attached secondary sensor unit is also known and fixed. A method and computer program product for numerically correcting distance measurement errors due to reflector orientation and position with respect to a primary sensor, in particular a tachymeter.

11 Claims, 5 Drawing Sheets

(56) References Cited

U.S. PATENT DOCUMENTS

| | | |
|---|---|---|
| 10,054,439 B2 | 8/2018 | Jensen et al. |
| 10,234,287 B2 | 3/2019 | Siercks et al. |
| 11,656,338 B2 | 5/2023 | Jensen et al. |
| 2001/0019101 A1 | 9/2001 | Ohtomo |
| 2005/0077454 A1 | 4/2005 | Ohtomo |
| 2009/0024325 A1 | 1/2009 | Scherzinger |
| 2012/0163656 A1* | 6/2012 | Wang .................... G01S 19/485 |
| | | 382/103 |
| 2012/0186090 A1 | 7/2012 | Ward |
| 2017/0176185 A1 | 6/2017 | Maar |
| 2018/0180416 A1 | 6/2018 | Edelman |
| 2020/0141729 A1 | 5/2020 | Nishita |

FOREIGN PATENT DOCUMENTS

| | | |
|---|---|---|
| CN | 106461391 A | 2/2017 |
| EP | 2 722 647 A1 | 4/2014 |
| EP | 3 627 101 A1 | 3/2020 |

OTHER PUBLICATIONS

European Search Report dated Feb. 28, 2022 as received in application No. 21209175.5.
European Search Report dated May 20, 2021 as received in Application No. 20213568.7.

* cited by examiner

SURVEYING POLE AND SECONDARY SENSOR UNIT HAVING TOROIDAL FORM

FIELD OF THE INVENTION

The present invention relates to a system, method and computer program product according to the preambles of the independent claims.

BACKGROUND

For staking out or measuring terrain points, surveying poles are often used in the surveying or construction industry. Surveying poles are typically used in combination with a primary sensor, usually embodied as a tachymeter or GNSS receiver. The position measurement of a point of interest on which a pole tip of the surveying pole is placed is usually not taken directly but rather by first determining position of a reflector or a GNSS receiver/antenna on the surveying pole, and then by inferring the position of the point of interest using a known spatial relationship between reflector/antenna and the pole tip.

Such an indirect measurement may require a free line of sight between the primary sensor and reflector/antenna. Additionally, the spatial relationship between a measured center of the reflector/antenna and the pole tip needs to be known.

An operator using surveying poles for staking out or measuring terrain points is required to—in the absence of further sensors—a) detect the current pole length, b) detect the current pole pose and level the surveying pole for each measurement, and c) detect the current reflector pose and change the reflector pose so as to minimize measurement errors.

Manufacturers of surveying equipment have therefore started to develop additional secondary sensors which can be attached to the surveying pole. Such secondary sensors may be used as supplement or substitute to the primary sensor observation to measure points of interest.

Known solutions for attaching secondary sensors and a reflector to a surveying pole from the state of the art are often based on the stacking principle, e.g. realized by a screw thread interface or a quick release interface. With the screw thread interface, secondary sensors may be attached on top of a reflector (e.g. used in Topcon's RC-5 and in Leica's GS16) or in-between a reflector/antenna and the surveying pole (e.g. used in Trimble's AT360), and with the quick release interface, a reflector may be pushed from the top into a sensor (e.g. used in Trimble's Y10). From the state of the art it is also known to attach sensors via clamps or clamping screws to a surveying pole.

Surveying poles from the state of the art to which both a reflector and a secondary sensor are attached often suffer from the problem that the presence of the secondary sensor changes the distance from the reflector to the pole tip. State of the art solutions furthermore often place the secondary sensor in such a way that possible incidence angles with which measurement light can impinge on the reflector are reduced as compared to a surveying pole without secondary sensor. In state of the art surveying protocols, the reflector is furthermore required to be oriented in a precise manner to the primary sensor so as to reduce distance measurement errors.

SUMMARY

Aspects of the present disclosure provide a surveying pole and secondary sensor unit for staking out or measuring terrain points.

Aspects of the present disclosure provide a method for numerically correcting distance measurement errors between the primary sensor and the reflector due to reflector orientation and position.

Aspects are achieved by realizing the characterizing features of the independent claims. Features which further develop the disclosure in an alternative or advantageous manner are described in the dependent patent claims.

The disclosure relates to a surveying pole for staking out or measuring terrain points, wherein the surveying pole is configured so that a reflector and/or GNSS receiver, and a secondary sensor unit are attachable to the surveying pole. The surveying pole comprises a pole tip and two segments, wherein a second segment of the two segments is closer to the pole tip than a first segment of the two segments. The secondary sensor unit is attachable to the second segment and the reflector and/or GNSS receiver is attachable to the first segment. The surveying pole comprises at a segment end of the second segment a shoulder and a first part of a locking mechanism configured to interact with a second part of the locking mechanism provided by the secondary sensor unit, the first and second part of the locking mechanism configured to provide locking of the secondary sensor unit to the surveying pole. In an attached state, the secondary sensor unit is attached to the surveying pole, and the surveying pole passes through a central hole of the secondary sensor unit, which central hole fully pierces the secondary sensor unit, and at least a part of the second segment is fully surrounded by the secondary sensor unit and the first segment is outside the central hole. The surveying pole is configured in such a way that the reflector and/or GNSS receiver and the secondary sensor unit are independently attachable to the surveying pole, and in the attached state, a distance between an attached reflector and/or GNSS receiver and the secondary sensor unit is known and fixed, and a distance between the pole tip and the attached reflector and/or GNSS receiver is known and independent of whether or not the secondary sensor unit is attached to the surveying pole.

The secondary sensor unit and/or the reflector may be attachable in a rigid or semi-rigid manner to the surveying pole.

The disclosure also relates to a secondary sensor unit, the secondary sensor unit comprising a secondary sensor and a secondary sensor housing surrounding the secondary sensor, wherein the secondary sensor unit is configured to be attached to a surveying pole. The secondary sensor unit is configured to be attached to a surveying pole, wherein the secondary sensor housing is substantially embodied in the form of a topological torus having a central hole, and an interaction part of the secondary sensor unit located around a hole end of the central hole is configured to interact with a shoulder of the surveying pole. The interaction part of the secondary sensor unit comprises a second part of a locking mechanism, wherein a first part of the locking mechanism is provided by the surveying pole, the first and second part of the locking mechanism being configured to jointly provide locking of the secondary sensor unit to the surveying pole. The secondary sensor unit is configured to be attached to the surveying pole by moving the surveying pole through the central hole, wherein a first segment of the surveying pole is moved through the central hole before a second segment, wherein interaction between the shoulder and the interaction part of the secondary sensor unit limits motion of the surveying pole through the central hole, wherein in an attached state the shoulder and the interaction part are configured to interact and the first and second part of the locking mechanism are configured to lock the secondary sensor unit to the surveying pole.

The secondary sensor unit may determine orientation and/or position of an object such as a surveying pole, or it may determine distance and orientation of itself to a remote object. The secondary sensor unit may also determine a part of a surveying pole geometry, and/or it may support search and tracking of a reflector.

A topological torus is understood to be any surface which can be mapped by a homeomorphism onto a torus, i.e. a surface of revolution generated by revolving a circle in three-dimensional space about an axis that is coplanar with the circle. Examples of topological tori are donuts and coffee cups. The secondary sensor housing substantially corresponds to a nondegenerate torus, i.e. a central hole exists.

The locking mechanism prevents the secondary sensor unit from falling off the surveying pole in case the surveying pole is rotated in space.

In an embodiment of the secondary sensor unit, the secondary sensor comprises an inertial measurement unit (IMU), and/or an inclination sensor, and/or a camera, and/or a laser unit configured for distance and position estimation.

In an embodiment of the surveying pole and of the secondary sensor unit, the secondary sensor and additional components are positioned in such a way within a volume surrounded by the secondary sensor housing that in the attached state, and in case a main direction of the surveying pole is aligned with a gravity direction, the secondary sensor unit substantially exerts only a force acting along the gravity direction on the surveying pole.

The additional components may be e.g. embodied as processing unit(s), batteries and/or power units, or as computer memory.

The secondary sensor and the additional components may therefore be distributed in a balanced way within the secondary sensor housing. The main direction of the surveying pole may be the direction from pole tip to an end of the first segment at which the reflector and/or GNSS receiver can be attached. In case the surveying pole is placed orthogonally onto the ground, a balanced attached secondary sensor unit may exert a force on the surveying pole which only acts along the main direction which in this case may correspond to the gravity direction.

In a further embodiment of the secondary sensor unit and of the surveying pole, at a further hole end of the central hole, the further hole being at an opposite end of the central hole as compared to the hole end, the secondary sensor unit comprises a bearing ring having a bearing ring diameter substantially equal to a second segment diameter of the second segment, wherein the bearing ring and the interaction part act as a two-point bearing on the surveying pole.

The bearing ring may tightly fit around the second segment of the surveying pole. Movement of the surveying pole relative to the attached secondary sensor unit may therefore be constrained by the bearing ring. Together with the movement constraint provided by the interaction of shoulder/secondary sensor housing, the secondary sensor unit may be attached in a stable manner to the surveying pole without a substantial amount of relative movement between secondary sensor unit and surveying pole.

In a further embodiment of the surveying pole and the secondary sensor, the secondary sensor unit comprises a release mechanism configured to unlock the secondary sensor unit from the surveying pole.

In a further embodiment of the surveying pole and the secondary sensor unit, the locking mechanism is provided by a notch on the surveying pole, wherein the secondary sensor unit is configured to automatically snap into the notch.

In a further embodiment of the surveying pole and the secondary sensor unit, an additional rotational locking mechanism is provided through single notches on the surveying pole which the secondary sensor unit is configured to snap into, wherein the single notches are distributed in such a way on the surveying pole that a known orientation of the secondary sensor unit to the surveying pole is provided after rotational locking, and/or the reflector and/or GNSS receiver is configured to be rigidly attached to the first segment using a further rotational locking mechanism jointly provided by the surveying pole and the reflector and/or GNSS receiver, wherein after rotational locking of the reflector and/or GNSS receiver a relative orientation of the reflector and/or GNSS receiver to the secondary sensor unit is known.

Knowing the relative orientation of the reflector and/or GNSS receiver to the secondary sensor unit may be beneficial for metrological application.

The disclosure also relates to a method for distance error correction applied to an uncorrected distance measured between a primary sensor unit, in particular embodied as a tachymeter, and a reflector, in particular embodied as a 360° prism, in a primary sensor unit coordinate system using measurement light emitted by the primary sensor unit towards the reflector, the measurement light traveling along a line of sight to the reflector. The method is provided with an orientation and position of a reflector coordinate system with respect to the primary sensor unit coordinate system, and with a coordinate transform between the reflector coordinate system and the primary sensor unit coordinate system. The method is also provided with at least one angle of incidence of the measurement light used for obtaining the uncorrected distance in the reflector coordinate system, the at least one angle of incidence being determined based on the line of sight between the primary sensor unit and the reflector and on the reflector coordinate system. The method comprises the following steps: 1) determining a distance error in the reflector coordinate system using a calibrated distance error function with at least the at least one angle of incidence being provided as input to the calibrated distance error function, 2) determining a distance error in the primary sensor unit coordinate system using the coordinate transform and the distance error in the reflector coordinate system, and 3) correcting the uncorrected distance between the primary sensor unit and the reflector using the distance error in the primary sensor unit coordinate system.

The term distance is to be understood as referring to coordinate values of coordinates of a coordinate system. In case of a Cartesian coordinate system, for example, distance would be evaluated in terms of the usual x, y and z axes, while for a spherical coordinate system, a coordinate may refer to an angle. The term distance error is also related to coordinates of a specific coordinate system, and may express errors in a coordinate relating to an angle, e.g. in a spherical coordinate system, or in a coordinate relating to an actual spatial distance, e.g. in a Cartesian coordinate system. A distance error may also be determined only for individual coordinates.

The term uncorrected distance is to be understood as uncorrected with respect to the correction step carried out by the method. Other correction steps may have been applied to the uncorrected distance beforehand.

In an embodiment of the method for distance error correction, the calibrated distance error function additionally uses parameters describing the primary sensor unit as input, in particular parameters relating to a laser of a tachymeter.

In a further embodiment of the method for distance error correction, three angles of incidence are provided to the calibrated distance error function as input, or only those angles of incidence are provided as input which relate to possible construction-related orientations of the reflector coordinate system.

The disclosure also relates to a computer program product configured to provide distance error correction as in the method.

The disclosure also relates to a tachymeter for determining distance to a reflector on a surveying pole and to a surveying pole to which a secondary sensor unit is attached, the surveying pole and secondary sensor unit in particular being embodied as described herein, the tachymeter and/or secondary sensor unit comprising a computing unit comprising program code as in the computer program product according to the disclosure, wherein the surveying pole is configured to be placed onto a terrain point with an arbitrary orientation.

The surveying pole need not be placed orthogonally onto the ground at a terrain point to be measured. The computer program product according to the disclosure is configured to correct distance measurement errors due to suboptimal surveying pole placement and orientation.

BRIEF DESCRIPTION OF THE DRAWINGS

The inventive system is described below in more detail purely by way of example with the aid of concrete exemplary embodiments illustrated schematically in the drawings, further advantages also being examined Identical elements are labelled with the same reference numerals in the figures. In detail.

DETAILED DESCRIPTION

Figure 1:
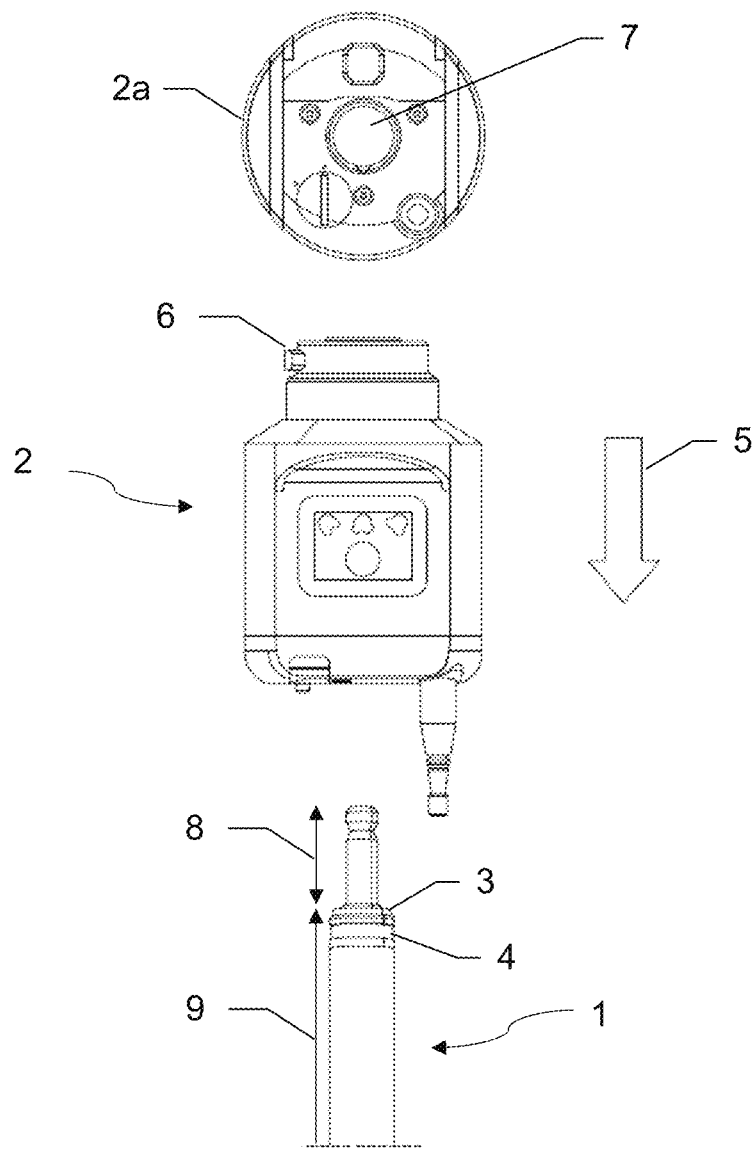
FIG. 1 shows an embodiment of a surveying pole and of a secondary sensor unit.

FIG. 1 shows an embodiment of a surveying pole 1 and of a secondary sensor unit 2.

The secondary sensor unit 2 comprises a secondary sensor housing (shown in FIG. 1) and a secondary sensor (not shown). The secondary sensor is arranged within the secondary sensor housing. The secondary sensor may e.g. comprise an inertial measurement unit (IMU), and/or a camera, and/or a laser unit configured for distance and position estimation. The secondary sensor unit 2 is configured to be attached to the surveying pole 1; it may be used for determining orientation of the surveying pole 1 to which it is attached with respect to some coordinate system (not shown). The secondary sensor housing corresponds topologically substantially to a torus, i.e. the secondary sensor housing can substantially be continuously deformed to have a donut shape. The secondary sensor housing comprises a central hole 7 around which the secondary sensor housing lies. In a view of the secondary sensor unit 2 from above 2a, the central hole 7 is clearly visible. The central hole 7 pierces through the entire secondary sensor housing.

The surveying pole 1 comprises a first segment 8 and a second segment 9. The second segment 9 comprises a shoulder 3 and a notch 4 at one of its ends. To attach the secondary sensor unit 2 to the surveying pole 1, the surveying pole 1 is moved 5—starting with the first segment 8 and proceeding with the second segment 9—through the central hole 7 of the secondary sensor housing. A part of the secondary sensor housing is configured to interact with the shoulder 3 and the notch 4. Specifically, when moving 5 the surveying pole 1 through the central hole 7, a part of the secondary sensor housing is configured to come to rest on the shoulder 3 of the second segment 9 of the surveying pole 1. The interaction of shoulder 3 and secondary sensor housing is therefore configured to limit the possible motion range of the secondary sensor unit 2 along the surveying pole 1, i.e. once the part of the secondary sensor housing configured to interact with the shoulder 3 comes to rest on the shoulder 3, no further movement of the second segment 9 of the surveying pole 1 through the secondary sensor unit 2 is possible. The secondary sensor housing is configured in such a way so as to provide a locking mechanism of the secondary sensor unit 2 to the surveying pole 1 through the interplay of the secondary sensor housing with the notch 4, e.g. by automatically snapping into the notch 4 once the secondary sensor housing comes to rest on the shoulder 3. A release mechanism, e.g. started by pressing a release button 6 of the secondary sensor unit 2, is configured to release the secondary sensor unit 2 from being locked to the surveying pole 1. After releasing, the secondary sensor unit 2 can be removed from the surveying pole 1.

Figure 2:
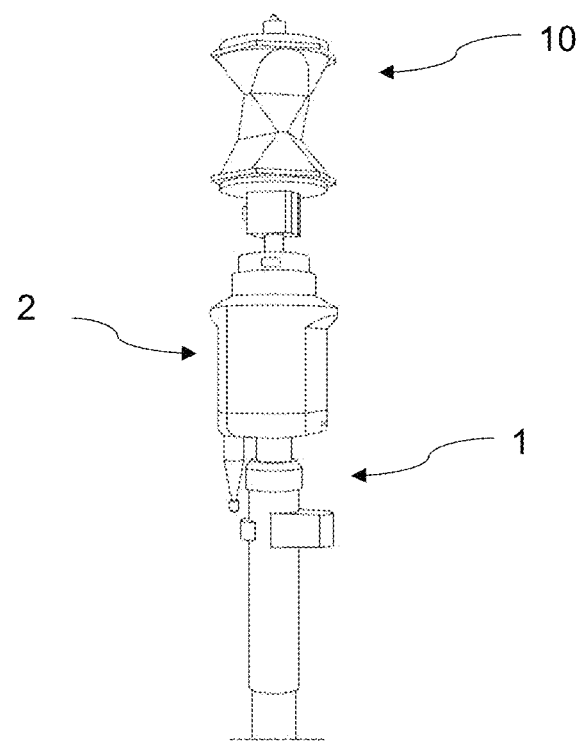
FIG. 2 shows an embodiment of a surveying pole and of a secondary sensor unit, with a reflector attached to the surveying pole.

FIG. 2 shows an embodiment of a surveying pole 1 and of a secondary sensor unit 2, with a reflector 10 attached to the surveying pole 1. Instead of the reflector 10, a GNSS receiver (not shown) may be attached to the surveying pole 1. The term reflector may be replaced by the term GNSS receiver. The secondary sensor unit 2 is also attached to the surveying pole 1. The secondary sensor unit 2 is configured as described in the embodiment of FIG. 1. After attaching the secondary sensor unit 2 to the surveying pole 1 as described in the embodiment of FIG. 1, the first segment 8 of the surveying pole 1 protrudes from the secondary sensor unit 2. The reflector 10 is attached to the first segment 8 of the surveying pole 1. In FIG. 2, the reflector 10 is embodied as a 360° prism. For the surveying pole 1, the reflector 10 can be attached with or without the secondary sensor unit 2 to the surveying pole 1. If both the secondary sensor unit 2 and the reflector 10 are attached to the surveying pole 1, a known distance between the secondary sensor unit 2 and the reflector 10 exists.

Figure 3:
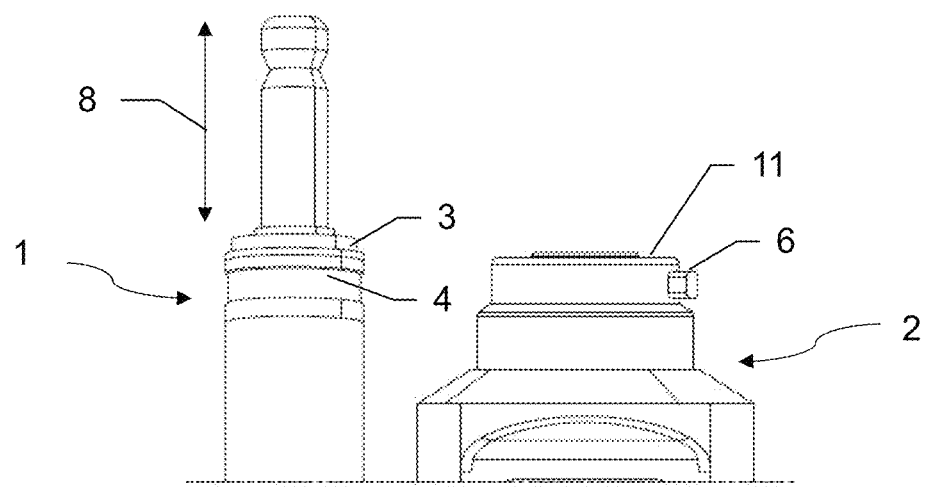
FIG. 3 shows a closer view of an embodiment of a surveying pole and of a secondary sensor unit.

FIG. 3 shows a closer view of an embodiment of a surveying pole 1 and of a secondary sensor unit 2. The surveying pole 1 and the secondary sensor unit 1 are configured as described in the embodiment of FIG. 1 and are configured to be attached to one another as described in the embodiment of FIG. 1. In FIG. 3, the surveying pole 1 and the secondary sensor unit 2 are juxtaposed, wherein the surveying pole 1 and the secondary sensor unit 2 are positioned in height relative to one another in such a way as if the secondary sensor unit 2 were attached to the surveying pole 1. The release button 6 is on the same height as the notch 4 which is used for locking the secondary sensor unit 2 to the surveying pole 1. A part 11 of the secondary sensor housing around the central hole 7 comes to rest on the shoulder 3, limiting further downward motion of the secondary sensor unit 3 along the surveying pole 1.

Figure 4:
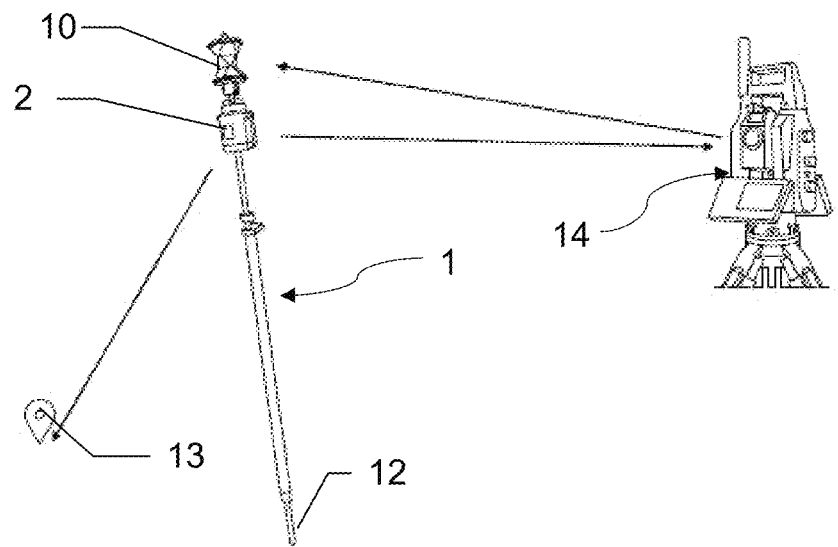
FIG. 4 shows an embodiment of a surveying pole and of a secondary sensor unit, and a tachymeter.

FIG. 4 shows an embodiment of a surveying pole 1 and of a secondary sensor unit 2, and a tachymeter 14. A reflector 10, in FIG. 4 embodied as a 360° prism, is attached to the surveying pole 1. The surveying pole 1 comprises a pole tip 12 which is placed on a terrain point to be measured. Specifically, if the distance between the reflector 10 and the pole tip 12 is known and if a distance between the reflector 10 and the tachymeter 14 has been determined, a position of the pole tip 12 can be determined, provided the attitude of the surveying pole 1 can be determined or is known. The secondary sensor unit 2 may also be configured to be able to determine a distance and orientation to an outside object 13. It may also, e.g. using an IMU, determine the orientation of the surveying pole 1 to which it is attached. If both secondary sensor unit 2 and reflector 10 are attached to the surveying pole 1, a distance between them is known and fixed. The distance between the reflector 10 and the pole tip 12 is independent of whether or not the secondary sensor unit 2 is attached to the surveying pole.

Figure 5:
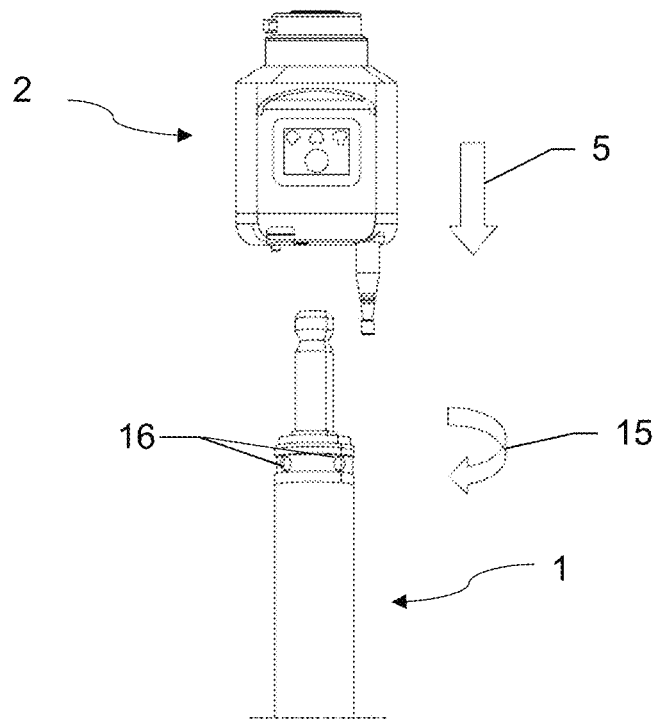
FIG. 5 shows an embodiment of a surveying pole and of a secondary sensor unit, with a rotational locking mechanism.

FIG. 5 shows an embodiment of the surveying pole 1 and the secondary sensor unit 2, with an additional rotational locking mechanism for fixing an orientation between the surveying pole 1 and the secondary sensor unit 2. Compared to the embodiment of FIG. 1, the surveying pole 1 comprises additional single notches 16. The single notches 16 can be spaced around the surveying pole 1, preferentially being placed so as to allow only one possible orientation which the secondary sensor unit 2 can snap into. The secondary sensor unit 2 may comprise pins which snap into the single notches, for example. Locking occurs by rotating 15 the secondary sensor unit 2 around a longitudinal axis of the surveying pole 1 until e.g. the pins of the second sensor unit 2 snap into the single notches 16 of the surveying pole 1.

Figure 6:
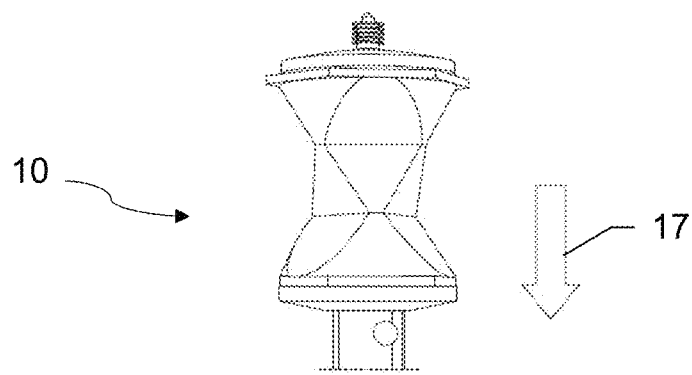
FIG. 6 shows an embodiment of a surveying pole, with a rotational locking mechanism for a reflector.
Figure 6:
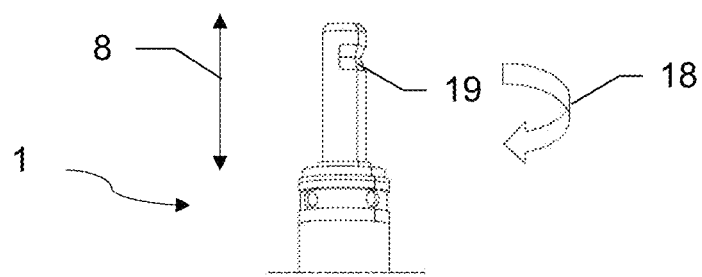

FIG. 6 shows a 360° prism used as reflector 10 and a part of a surveying pole 1. The reflector 10 can be attached by moving 17 it along the first segment of the surveying pole 1. A further rotational locking mechanism may be provided, e.g. by a notch 19 on the first segment. After rotational locking, e.g. by achieved by rotating 18 the reflector 10 around the first segment 8, a fixed orientation between reflector 10 and surveying pole 1 can be achieved. Such a fixed orientation may also allow for a fixed orientation between the reflector 10 and a secondary sensor unit 2 (not shown), facilitating further measurements.

Figure 7:
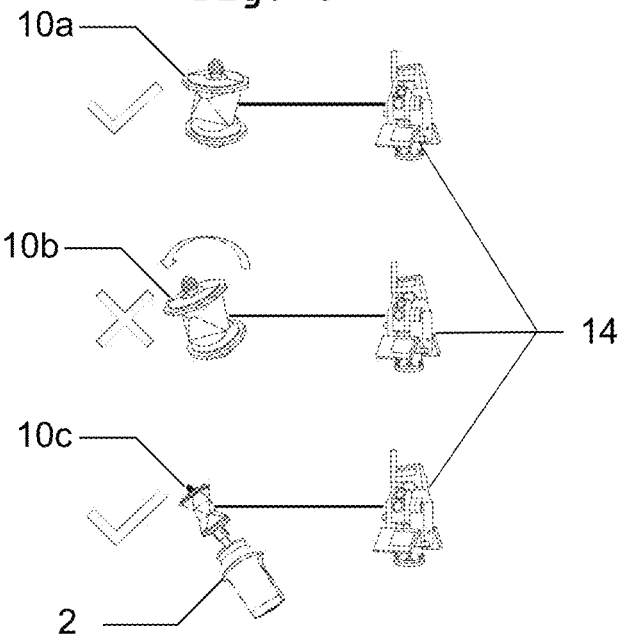
FIG. 7 shows an illustrative depiction of the impact of reflector orientation and position on distance measurement accuracy with respect to a tachymeter, and a surveying pole, secondary sensor unit and reflector arrangement for correcting measurement errors due to reflector orientation and position.

FIG. 7 shows an illustrative depiction of the impact of reflector orientation and position on distance measurement accuracy with respect to a tachymeter 14, and a surveying pole 1, secondary sensor unit 2 and reflector 10c arrangement for correcting measurement errors due to reflector orientation and position. The reflector 10a, 10b, 10c is embodied as a 360° prism in FIG. 7. The orientation of reflector 10b with respect to the tachymeter is worse than the orientation of reflector 10a. In general, reflector orientation and position impacts the accuracy of distance estimation between the tachymeter 14 and a reflector 10a, 10b, 10c. By using a surveying pole 1 with a reflector 10c and secondary sensor unit 2, measurement errors may be numerically corrected.

Figure 8:
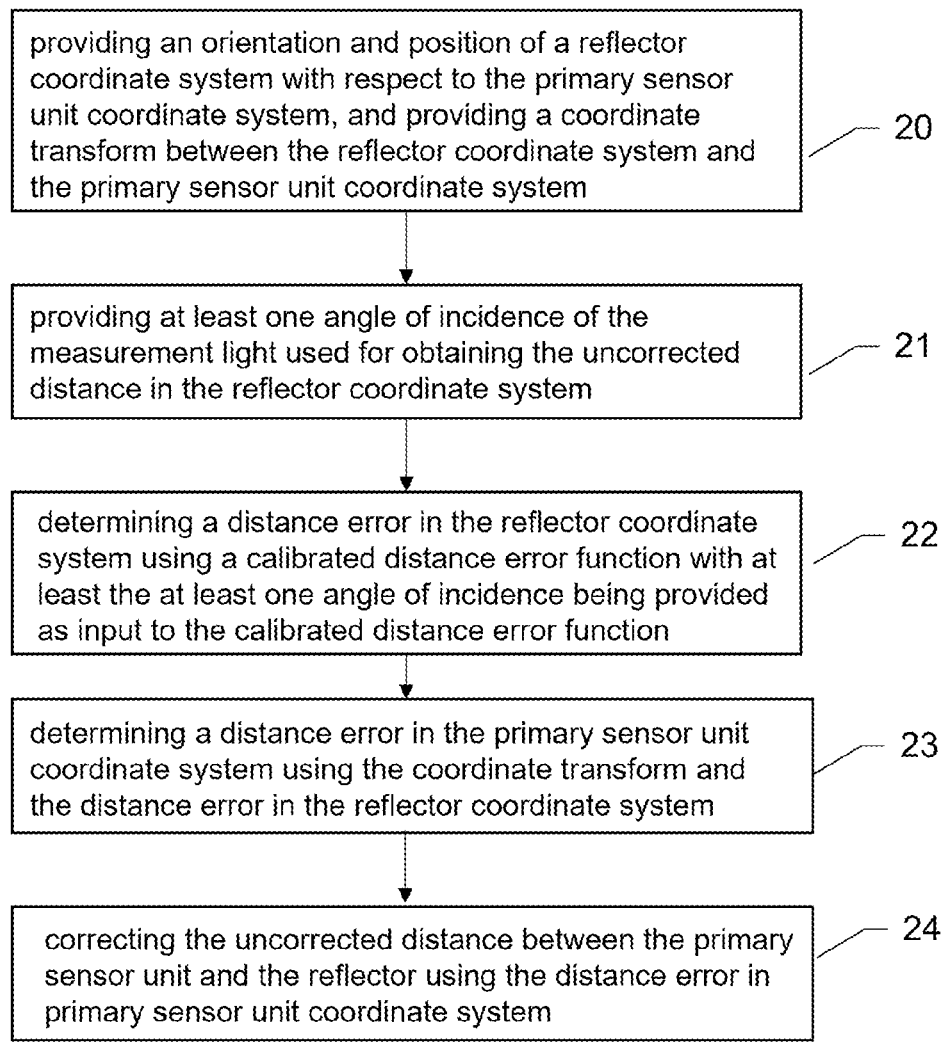
FIG. 8 shows an illustrative depiction of the method—as well as steps preceding the method—for correcting distance measurement errors.

FIG. 8 shows an illustrative depiction of the method—as well as steps preceding the method—for correcting distance measurement errors occurring in distance measurements between e.g. a tachymeter and a reflector.

Both the tachymeter and the reflector can each be associated to a coordinate system, a primary sensor unit coordinate system and a reflector coordinate system. Using e.g. a secondary sensor unit 2 as in the embodiment of FIG. 1, which secondary sensor unit 2 is rigidly attached to a surveying pole 1, the secondary sensor unit 2 can be used for tracking orientation and position of the surveying pole, e.g. by using an inertial measurement unit, and using a known orientation between the reflector and the surveying pole 1, the orientation and position of the reflector can be tracked as in a step 20 of FIG. 8. From the tracked reflector coordinate system, a coordinate transformation can be determined, wherein a coordinate transformation maps the reflector coordinate system onto the primary sensor unit coordinate system or vice versa.

In another step 21, using a known line of sight between the tachymeter and the reflector, incidence angles of measurement light, the measurement light emitted by the tachymeter, impinging on the reflector can be determined in the reflector coordinate system.

In a first step 22 of the method, a predetermined calibrated distance error function can be used for determining a measurement distance error caused by the orientation of the reflector with respect to impinging measurement light. The predetermined calibrated distance error function can be specifically tailored to a single reflector, or to a production batch, or to a reflector model type etc. The calibrated distance error function can take the incidence angles as input, providing a distance error expressed in the reflector coordinate system. Besides incidence angles, other types of input can be provided to the calibrated distance error function as well, e.g. inputs relating to the tachymeter.

In a second step 23 of the method, the distance error expressed in the reflector coordinate system is transformed to a distance error expressed in the primary sensor unit coordinate system.

The distance error expressed in the primary sensor unit coordinate system is used in a third step 24 of the method for numerically correcting an uncorrected distance determined between the tachymeter and the reflector.

Although the invention is illustrated above, partly with reference to some preferred embodiments, it must be understood that numerous modifications and combinations of different features of the embodiments can be made. All of these modifications lie within the scope of the appended claims.

What is claimed is:

1. A surveying pole for staking out or measuring terrain points, wherein the surveying pole comprises:
   a reflector and/or a GNSS receiver, and
   a secondary sensor unit,
   are attachable to the surveying pole, and wherein the surveying pole comprises a pole tip, and
   two segments, wherein a second segment of the two segments is closer to the pole tip than a first segment of the two segments,
   wherein the secondary sensor unit is attachable to the second segment and the reflector and/or GNSS receiver is attachable to the first segment, wherein the surveying pole comprises at a segment end of the second segment a shoulder and a first part of a locking mechanism configured to interact with a second part of the locking mechanism provided by the secondary sensor unit, the first and second part of the locking mechanism configured to provide locking of the secondary sensor unit to the surveying pole, in an attached state, the secondary sensor unit is attached to the surveying pole, and the surveying pole passes through a central hole of the secondary sensor unit, which central hole fully pierces the secondary sensor unit, and at least a part of the second segment is fully surrounded by the secondary sensor unit and the first segment is outside the central hole, and the surveying pole is configured in such a way that the reflector and/or the GNSS receiver and the secondary sensor unit are independently attachable to the surveying pole, and in the attached state, a distance between an attached reflector and/or GNSS receiver and the secondary sensor unit is known and fixed, and a distance between the pole tip and the attached reflector and/or GNSS receiver is known and independent of whether or not the secondary sensor unit is attached to the surveying pole.

2. A secondary sensor unit, the secondary sensor unit comprising a secondary sensor and a secondary sensor housing surrounding the secondary sensor, wherein the secondary sensor unit is configured to be attached to a surveying pole, wherein the secondary sensor unit is configured to be attached to the surveying pole according to claim 1, wherein the secondary sensor housing is substantially embodied in the form of a topological torus having a central hole, and an interaction part of the secondary sensor unit located around a hole end of the central hole is configured to interact with a shoulder of the surveying pole, wherein the interaction part of the secondary sensor unit comprises a second part of a locking mechanism, wherein a first part of the locking mechanism is provided by the surveying pole, the first and second part of the locking mechanism being configured to jointly provide locking of the secondary sensor unit to the surveying pole, and the secondary sensor unit is configured to be attached to the surveying pole by moving the surveying pole through the central hole, wherein a first segment of the surveying pole is moved through the central hole before a second segment, wherein interaction between the shoulder and the interaction part of the secondary sensor unit limits motion of the surveying pole through the central hole, wherein in an attached state the shoulder and the interaction part are configured to interact and the first and the second part of the locking mechanism are configured to lock the secondary sensor unit to the surveying pole.

3. The secondary sensor unit according to claim 2, wherein the secondary sensor comprises an inertial measurement unit (IMU), and/or an inclination sensor, and/or a camera, and/or a laser unit configured for distance and position estimation.

4. The secondary sensor unit according to claim 2, wherein the secondary sensor and additional components are positioned in such a way within a volume surrounded by the secondary sensor housing that
in the attached state, and
in case a main direction of the surveying pole is aligned with a gravity direction, the secondary sensor unit substantially exerts only a force acting along the gravity direction on the surveying pole.

5. The secondary sensor unit according to claim 2, wherein at a further hole end of the central hole, the further hole being at an opposite end of the central hole as compared to the hole end, the secondary sensor unit comprises a bearing ring having a bearing ring diameter substantially equal to a second segment diameter of the second segment, wherein the bearing ring and the interaction part act as a two-point bearing on the surveying pole.

6. The surveying pole according to claim 1, wherein the secondary sensor unit comprises a release mechanism configured to unlock the secondary sensor unit from the surveying pole.

7. The surveying pole according to claim 1, wherein the locking mechanism is provided by a notch on the surveying pole, wherein the secondary sensor unit is configured to automatically snap into the notch.

8. The surveying pole according to claim 7, wherein an additional rotational locking mechanism is provided through single notches on the surveying pole which the secondary sensor unit is configured to snap into, wherein the single notches are distributed in such a way on the surveying pole that a known orientation of the secondary sensor unit to the surveying pole is provided after rotational locking, and/or
the reflector and/or GNSS receiver is configured to be rigidly attached to the first segment using a further rotational locking mechanism jointly provided by the surveying pole and the reflector and/or GNSS receiver, wherein after rotational locking of the reflector and/or GNSS receiver a relative orientation of the reflector and/or GNSS receiver to the secondary sensor unit is known.

9. A tachymeter for determining distance to a reflector on a surveying pole, and surveying pole to which a secondary sensor unit is attached, wherein:
the surveying pole and secondary sensor unit in particular being embodied according to claim 1,
the surveying pole is configured to be placed onto a terrain point with an arbitrary orientation, and
the tachymeter and/or secondary sensor unit includes a computing unit having program code for performing a method for distance error correction applied to an uncorrected distance measured between a primary sensor unit, in particular embodied as a tachymeter, and a reflector, in particular embodied as a 360° prism, in a primary sensor unit coordinate system using measurement light emitted by the primary sensor unit towards the reflector, the measurement light traveling along a line of sight to the reflector, the method including:
providing an orientation and position of a reflector coordinate system with respect to the primary sensor unit coordinate system, and providing a coordinate transform between the reflector coordinate system and the primary sensor unit coordinate system, and
providing at least one angle of incidence of the measurement light used for obtaining the uncorrected distance in the reflector coordinate system, the at least one angle of incidence being determined based on the line of sight between the primary sensor unit and the reflector and on the reflector coordinate system,
determining a distance error in the reflector coordinate system using a calibrated distance error function with at least the at least one angle of incidence being provided as input to the calibrated distance error function, determining a distance error in the primary sensor unit coordinate system using the coordinate transform and the distance error in the reflector coordinate system, and correcting the uncorrected distance between the primary sensor unit and the reflector using the distance error in the primary sensor unit coordinate system.

10. The secondary sensor unit according to claim 3, wherein the secondary sensor and additional components are positioned in such a way within a volume surrounded by the secondary sensor housing that in the attached state, and in case a main direction of the surveying pole is aligned with a gravity direction, the secondary sensor unit substantially exerts only a force acting along the gravity direction on the surveying pole.

11. The secondary sensor unit according to claim 4, wherein at a further hole end of the central hole, the further hole being at an opposite end of the central hole as compared to the hole end, the secondary sensor unit comprises a bearing ring having a bearing ring diameter substantially equal to a second segment diameter of the second segment, wherein the bearing ring and the interaction part act as a two-point bearing on the surveying pole.

* * * * *